(12) United States Patent
Uetsuji et al.

(10) Patent No.: US 10,863,061 B2
(45) Date of Patent: Dec. 8, 2020

(54) IMAGE SENSOR

(71) Applicant: OMRON Corporation, Kyoto (JP)

(72) Inventors: Yasuhito Uetsuji, Kyoto (JP);
Masahiro Takayama, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/275,339

(22) Filed: Feb. 14, 2019

(65) Prior Publication Data

US 2019/0289181 A1   Sep. 19, 2019

(30) Foreign Application Priority Data

Mar. 15, 2018   (JP) .................. 2018-047678

(51) Int. Cl.
*H04N 5/225*   (2006.01)
*G03B 17/08*   (2006.01)

(52) U.S. Cl.
CPC ......... *H04N 5/22521* (2018.08); *G03B 17/08* (2013.01); *H04N 5/2252* (2013.01); *H04N 5/2254* (2013.01); *H04N 5/2256* (2013.01)

(58) Field of Classification Search
CPC ............. H04N 5/22521; H04N 5/2254; H04N 5/2252; H04N 5/2256; H04N 7/18; G03B 17/02; G03B 17/04
USPC ............ 348/207.99, 373, 229.1, 362, 79–80, 348/211.4, 211.5, 240.1, 240.2, 240.3, 348/296, 297, 312, 68
See application file for complete search history.

(56) References Cited

U.S. PATENT DOCUMENTS

| | | | |
|---|---|---|---|
| 9,979,933 B1 * | 5/2018 | Nunnink | H04N 7/18 |
| 2006/0038108 A1 | 2/2006 | Belau | |
| 2011/0254999 A1 | 10/2011 | Sugiyama et al. | |
| 2012/0170119 A1 | 7/2012 | Chu et al. | |

FOREIGN PATENT DOCUMENTS

| | | |
|---|---|---|
| CN | 101766049 | 6/2010 |
| CN | 102377918 | 3/2012 |
| CN | 204089985 | 1/2015 |

(Continued)

OTHER PUBLICATIONS

"Search Report of Europe Counterpart Application", dated Mar. 25, 2019, p. 1-p. 8.

(Continued)

*Primary Examiner* — Xi Wang
(74) *Attorney, Agent, or Firm* — JCIPRNET

(57) ABSTRACT

The disclosure provides a structure for suppressing occurrence of dew condensation on a cover member in an image sensor for industrial use. An image sensor includes an illumination part for illuminating a subject, a lens part for forming an optical image of the subject, an imaging part for generating an image based on the optical image, and a housing for accommodating the illumination part, the lens part, and the imaging part. A light-transmissive cover member covering a front side of the lens part and the illumination part is attached to the housing. A wall member partitioning a space where the lens part is arranged and a space where the illumination part is arranged is provided inside the housing, and the housing has a heat transfer structure for transferring heat generated inside the housing to the cover member.

5 Claims, 10 Drawing Sheets

(56) References Cited

FOREIGN PATENT DOCUMENTS

| | | |
|---|---|---|
| CN | 104717410 | 6/2015 |
| CN | 104834159 | 8/2015 |
| CN | 107690594 | 2/2018 |
| DE | 102013020894 | 4/2015 |
| JP | H08102881 | 4/1996 |
| JP | 2000175091 | 6/2000 |
| JP | 2004020798 | 1/2004 |
| JP | 2007214682 | 8/2007 |
| JP | 2015113118 | 6/2015 |
| JP | 2017198768 | 11/2017 |

OTHER PUBLICATIONS

"Office Action of China Counterpart Application", dated Jun. 30, 2020, with English translation thereof, p. 1-p. 19.

* cited by examiner

IMAGE SENSOR

CROSS-REFERENCE TO RELATED APPLICATION

This application claims the priority benefit of Japan Application No. 2018-047678, filed on Mar. 15, 2018. The entirety of the above-mentioned patent application is hereby incorporated by reference herein and made a part of this specification.

BACKGROUND

Technical Field

The disclosure relates to an image sensor used in a factory production line or the like and, in particular, to a structure for suppressing dew condensation and fogging.

Description of Related Art

In the factory production line, a system called an image sensor is frequently used to automate or save labor in inspection and management of products. Conventionally, a configuration in which a camera and an image processing device are connected by a cable has been common (see Patent Document 1) in recent years, and a processing-integrated-type image sensor that integrates a camera and an image processing device has also appeared to perform operations from imaging to image processing with one single device. Such a processing-integrated-type image sensor is also called a "smart camera", and some have been further integrated with illumination and lenses.

In the image sensor for industrial use, to secure the dustproof property and the waterproof property, the entire image sensor is covered with a highly airtight housing, and a structure in which the front of the lens and illumination is sealed with a transparent cover member is adopted. Therefore, when the moisture contained in the substrate or the like evaporates due to heating inside the sensor, there is no escape and the moisture-containing air fills inside the housing. At this time, when the outside air temperature is low, the moisture-containing air is cooled by the cover member, and dew condensation (fogging) may occur on the inner surface of the cover member. Since dew condensation on the cover member interferes with imaging, it is required to take countermeasures. In the case of the smart camera described above, since the temperature inside the sensor tends to rise due to the heat generated by the processor for image processing, countermeasures against dew condensation are more important than in the case of conventional image sensors.

Meanwhile, in Patent Documents 2 to 5, a structure in which a heating component inside the camera is connected with a lens or a lens cover via a heat conduction member to prevent dew condensation by heating the lens or the lens cover with the heat of the heating component has been proposed as a countermeasure against dew condensation in cameras. However, all of Patent Documents 2 to 5 relate to dew condensation prevention structures in cameras for consumer use, and it is difficult to simply convert these structures into one for an image sensor for industrial use.

RELATED ART

Patent Document(s)

[Patent Document 1] Japanese Laid-open No. 2007-214682
[Patent Document 2] Japanese Laid-open No. 8-102881
[Patent Document 3] Japanese Laid-open No. 2004-20798
[Patent Document 4] Japanese Laid-open No. 2015-113118
[Patent Document 5] Japanese Laid-open No. 2017-198768

Problems to be Solved

In the image sensor for industrial use, since it is required to arrange the lens and the illumination close to each other inside the housing, in many cases, a structure in which a space where the lens is arranged and a space where the light source is arranged are partitioned by a wall member (light shielding member) to prevent the illumination light from directly entering the lens is adopted. In the case where such a structure is adopted, since the wall member (light shielding member) is present between the cover member on the front of the lens where the issue of dew condensation occurs and the heating component, due to physical restrictions, it is difficult to adopt the dew condensation prevention structure as described in Patent Documents 2 to 5, i.e., a structure in which a heat conduction member connects the heating component and the cover member.

SUMMARY

An aspect of the disclosure relates to an image sensor including an illumination part for illuminating a subject, a lens part for forming an optical image of the subject, an imaging part for generating an image based on the optical image, and a housing for accommodating the illumination part, the lens part, and the imaging part. A light-transmissive cover member covering a front side of the lens part and the illumination part is attached to the housing, and a wall member partitioning a space where the lens part is arranged and a space where the illumination part is arranged is provided inside the housing. The housing has a heat transfer structure for transferring heat generated inside the housing to the cover member.

DESCRIPTION OF THE EMBODIMENTS

Figure 1:
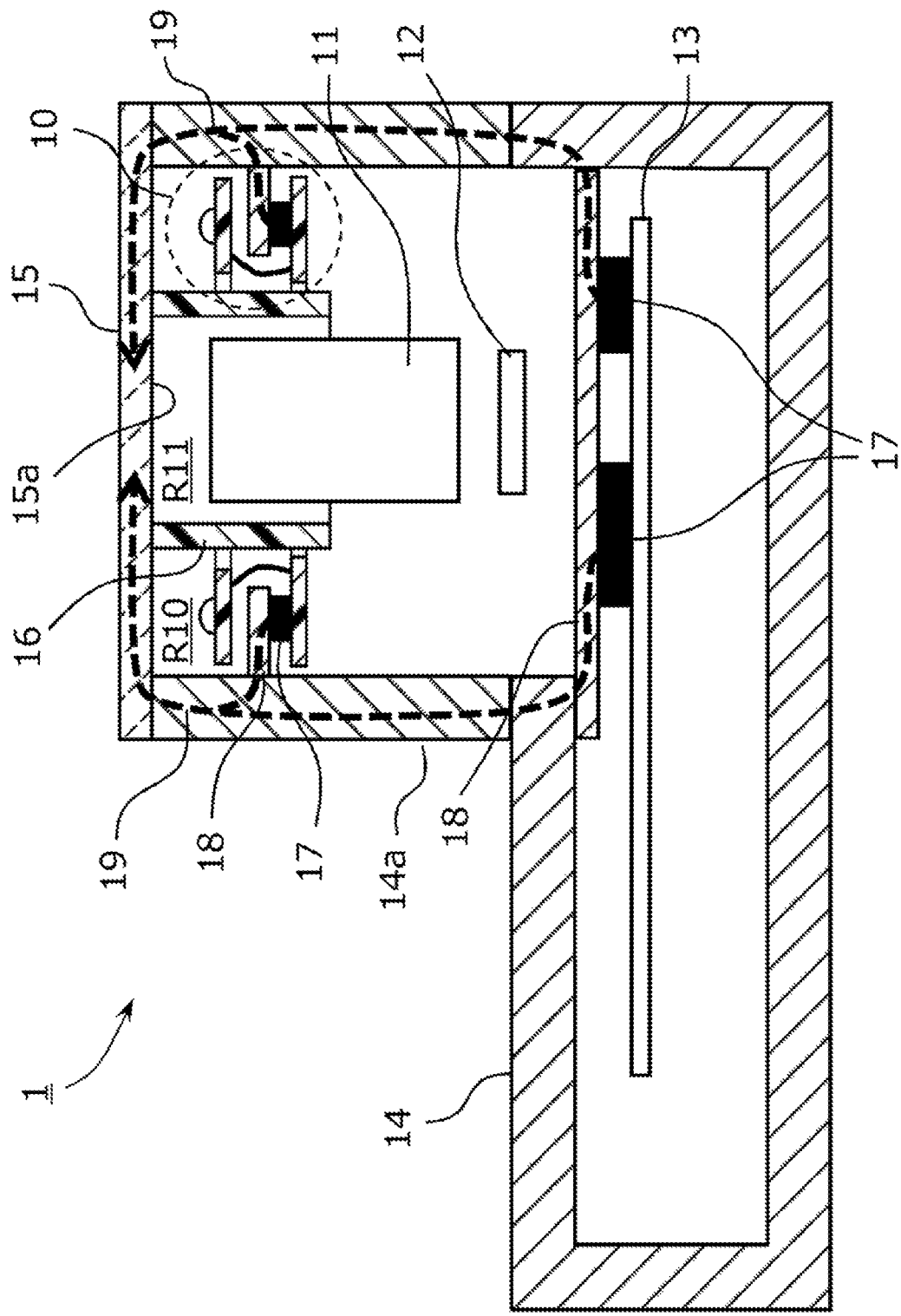
FIG. 1 is a cross-sectional view schematically showing a dew condensation prevention structure adopted in an image sensor according to the disclosure.

In view of the above circumstances, the disclosure provides a structure for suppressing occurrence of dew condensation on a cover member in an image sensor for industrial use.

Means for Solving the Problems

An aspect of the disclosure relates to an image sensor including an illumination part for illuminating a subject, a lens part for forming an optical image of the subject, an imaging part for generating an image based on the optical image, and a housing for accommodating the illumination part, the lens part, and the imaging part. A light-transmissive cover member covering a front side of the lens part and the illumination part is attached to the housing, and a wall member partitioning a space where the lens part is arranged and a space where the illumination part is arranged is provided inside the housing. The housing has a heat transfer structure for transferring heat generated inside the housing to the cover member.

In this way, by adopting the structure in which the heat transfer structure is provided in the housing of the image sensor, it is possible to form a heat transfer path from inside the housing to the cover member while avoiding physical interference between the heat transfer structure and the wall member present inside the housing. Therefore, even in the image sensor having the structure in which the space where the lens part is arranged and the space where the illumination part is arranged are partitioned by the wall member, it is possible to effectively suppress occurrence of dew condensation on the cover member.

The housing may include a case member made of metal. The case member may be in contact with a heating body present inside the housing directly or via a heat conduction member, and the case member may be in contact with the cover member directly or via a heat conduction member, so as to form the heat transfer structure.

In this way, the housing (the case member made of metal) itself forms a heat transfer structure. In other words, by adopting the structure in which the housing also serves as a heat transfer structure, it is possible to take countermeasures against dew condensation on the cover member while suppressing an increase in the number of parts as much as possible. Here, the "heat conduction member" may be any member as long as it has a high thermal conductivity, e.g., a rigid body such as a metal part, a flexible member such as a heat conduction sheet or a heat conduction double-sided tape, or a liquid or gel such as a thermally conductive adhesive. Also, "direct contact" is a state in which two members are physically and thermally connected, and "contact via a heat conduction member" is a state in which the two members (although not physically connected) are thermally connected by the intervention of a heat conduction member.

The case member may comprise a plurality of members including a first member and a second member which are separable. By separating the first member and the second member, since the inside of the housing can be opened, it is easy to assemble and replace the components inside the housing (e.g., the lens part, the illumination part, the imaging part, an optical filter, etc.). Such a structure is suitable for a so-called image sensor having a modular structure in which the lens part, the illumination part, and the imaging part are modularized and can be assembled and replaced on the user's end.

A first sealing member may be provided for sealing a gap between the first member and the second member. With the first sealing member, it is possible to secure the waterproof property and the dustproof property while the housing (the case member) is separable. For example, a seal member made of an elastomer may be used as the first sealing member. However, a sealing structure with such a seal member has a disadvantage in that it inhibits heat conduction. Therefore, apart from the sealing structure, a first contact part at which the first member and the second member are in direct contact may be formed. With this first contact part, heat conductivity between the first member and the second member is secured. With the above structure, it is possible to realize a housing (case member) that simultaneously satisfies separability, dustproof property, waterproof property, and heat conductivity requirements.

The second member may be attached to the first member while compressing the first sealing member in a first direction, and the first contact part may include a first contact surface perpendicular to the first direction and a second contact surface parallel to the first direction. By having the second member abut against the first member at the first contact surface and positioning the two members in the first direction, it is possible to appropriately control the compression amount (crushing amount) of the first sealing member. In addition, since the first member and the second member are brought into contact not only by the first contact surface but also by the second contact surface, it is possible to increase the contact area of the two members as much as possible and increase heat conductivity between the two members.

The cover member may be fixed to the second member. By separating the second member from the case member, since the front side of the lens part and the illumination part can be opened, it is easy to assemble and replace the lens part, the illumination part, and the optical filter. The heating body may be provided to be in contact with a member other than the second member (e.g., the first member, a third member connected to the first member, etc.) directly or via a heat conduction member.

A second sealing member may be provided for sealing a gap between the second member and the cover member. Although the second member made of metal and the light-transmissive cover member have to be constituted by separate members, by providing the second sealing member, it is possible to seal the joint between the second member and the cover member and secure the waterproof property and the dustproof property of the housing. Furthermore, apart from the sealing structure, a second contact part at which the second member and the cover member are in direct contact may be formed. With this second contact part, heat conductivity between the second member and the cover member is secured.

The second contact part may be formed closer to a center of the cover member than the second sealing member. With this structure, it is easier to transmit heat to the center of the cover member where dew condensation is likely to occur, and it is possible to more effectively suppress occurrence of dew condensation.

The cover member may be screw-fixed to the second member, the second sealing member may be provided closer to a center of the cover member than a screw fixing position where the cover member is screw-fixed to the second member, and the second contact part may be further formed closer to the center of the cover member than the second sealing member. By screw fixing, it is possible to firmly fix the cover member and the second member, and by further providing sealing on the inner side of the screwing fixing position, it is also possible to secure the waterproof property and the dustproof property between the cover member and the second member. By providing the second contact part on the further inner side of the sealing position, it is possible to efficiently perform heat transfer to the central part of the cover member and more effectively suppress occurrence of dew condensation.

The second member may have an extension part extending toward the heating body and in contact with the heating body directly or via a heat conduction member. In this way, with the structure in which the second member itself is in contact with the heating body, the heat of the heating body can be efficiently transmitted by the second member, and as a result, it is possible to more effectively suppress occurrence of dew condensation.

The illumination part may include a light source and a driving circuit of the light source, and the heating body may include at least one of the light source and the driving circuit of the light source. The image sensor may include a processing part including a processor for executing processing using the image, and the heating body may include the processor. The light source, the driving circuit of the light source, and the processor all generate high heat.

Effects

According to the disclosure, it is possible to suppress occurrence of dew condensation on the cover member in the image sensor for industrial use.

APPLICATION EXAMPLE

First, an example of the scene to which the disclosure is applied will be described. FIG. 1 is a cross-sectional view schematically showing a dew condensation prevention structure adopted in an image sensor according to the disclosure.

An image sensor 1 mainly includes an illumination part 10 for illuminating a subject, a lens part 11 for forming an optical image of the subject, an imaging part 12 for generating an image based on the optical image, and a processing part 13 for performing image processing, etc. The entire image sensor 1 is covered with a highly airtight housing 14, and the illumination part 10, the lens part 11, the imaging part 12, and the processing part 13 are accommodated in the internal space of the housing 14. A light-transmissive cover member 15 is attached to the housing 14, and the front side (subject side) of the illumination part 10 and the lens part 11 is covered with the cover member 15.

As shown in FIG. 1, inside the housing 14, a wall member (light shielding member) 16 is provided to surround the lens part 11. This wall member 16 partitions a space R10 where the illumination part 10 is arranged and a space R11 where the lens part 11 is arranged and prevents the light of the illumination part 10 from directly entering the lens part 11.

In the image sensor 1 having such a structure, when the outside air temperature is low, dew condensation may occur on an inner surface 15a of the cover member 15. If the central part of the cover member 15 (i.e., the part on the front side of the lens part 11) becomes foggy, it is not preferable because it interferes with imaging. Moreover, because the internal space of the housing 14 is partitioned by the wall member 16, it is physically difficult to provide a heat transfer member that directly connects a heating body 17 inside the housing 14 and the central part of the cover member 15.

Therefore, in the image sensor 1 of the present embodiment, the housing 14 itself forms a heat transfer structure (heat transfer path). By using the housing 14, interference with the wall member 16 present inside the housing can be avoided, and an increase in the number of parts can be prevented. As shown in FIG. 1, all or a part of the housing 14 is formed of a case member 14a, which is made of metal and has a high thermal conductivity, as a specific structure. Moreover, both the heating body 17 present inside the housing 14 and the cover member 15 are brought into contact with the case member 14a. Here, the heating body 17 and the cover member 15 may have a structure in direct contact with the case member 14a, or a structure in indirect contact with the case member 14a via a heat conduction member 18 having a high thermal conductivity. With such a configuration, a heat transfer structure that transmits the heat of the heating body 17 to the cover member 15 via the housing 14 (the case member 14a) is formed. Arrow 19 indicates the heat transfer path.

<Configuration of the Image Sensor>

Figure 2:
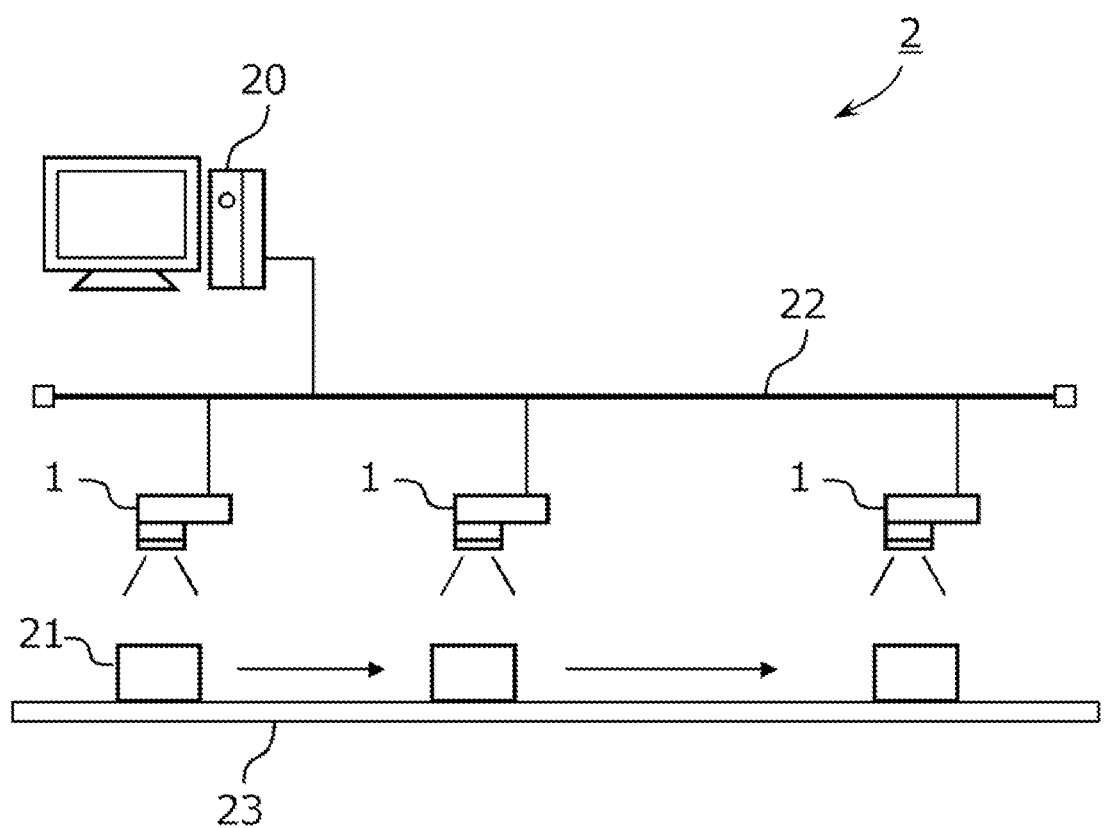
FIG. 2 is a view showing an example of a sensor system using an image sensor.
Figure 3A:
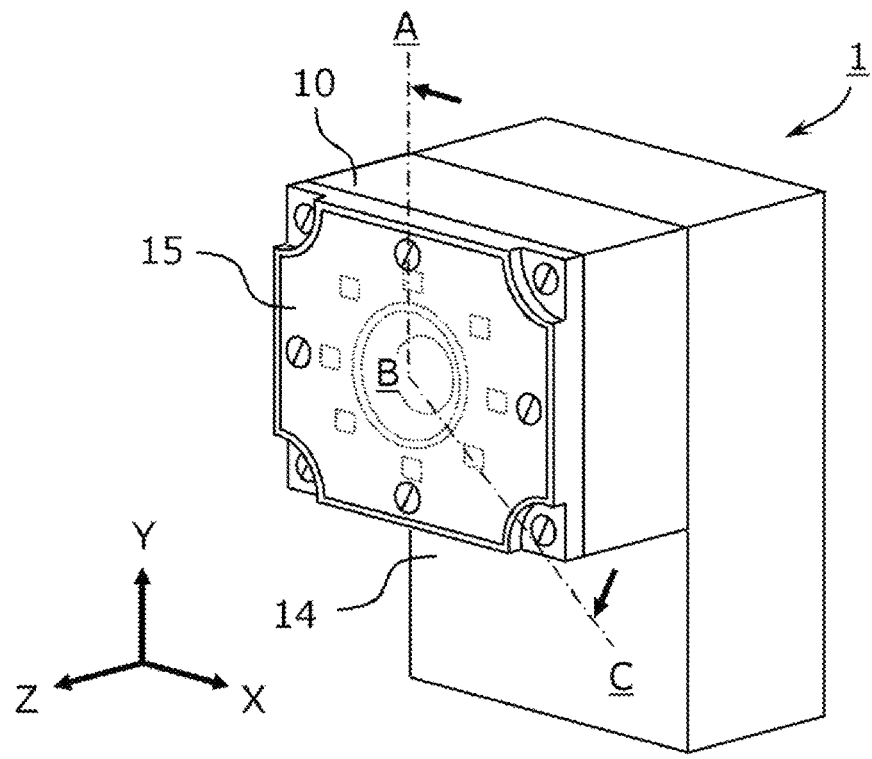
FIG. 3A is a perspective view schematically showing the appearance of the image sensor.
Figure 3B:
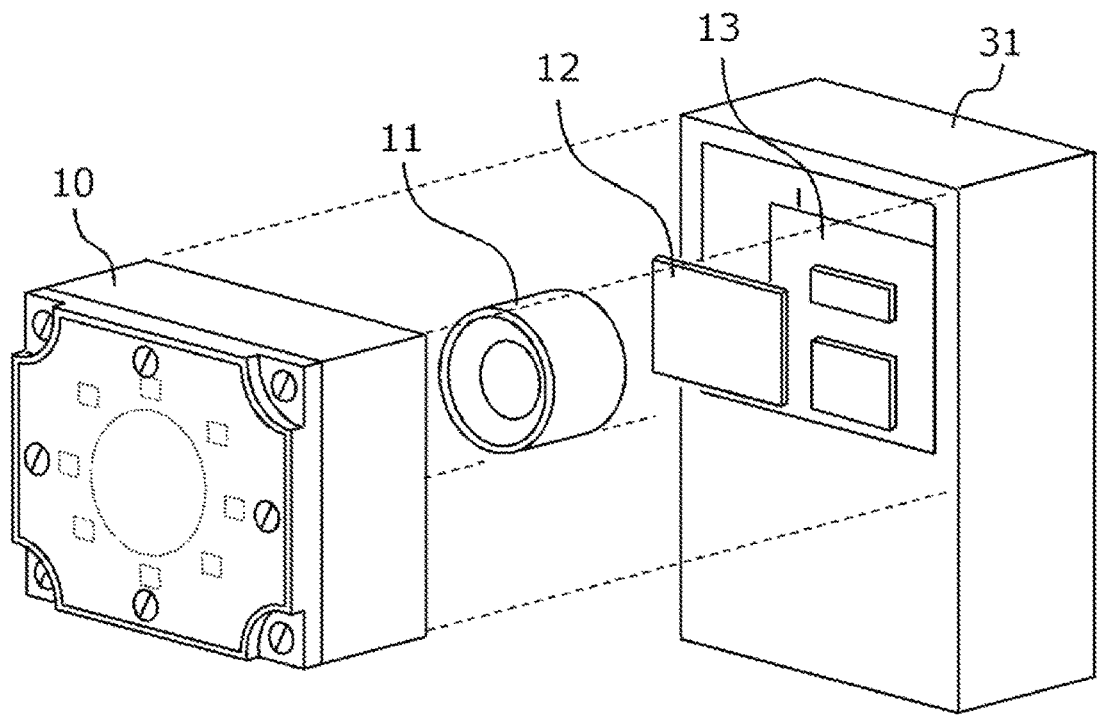
FIG. 3B is a perspective view schematically showing a state in which the image sensor is disassembled.
Figure 4:
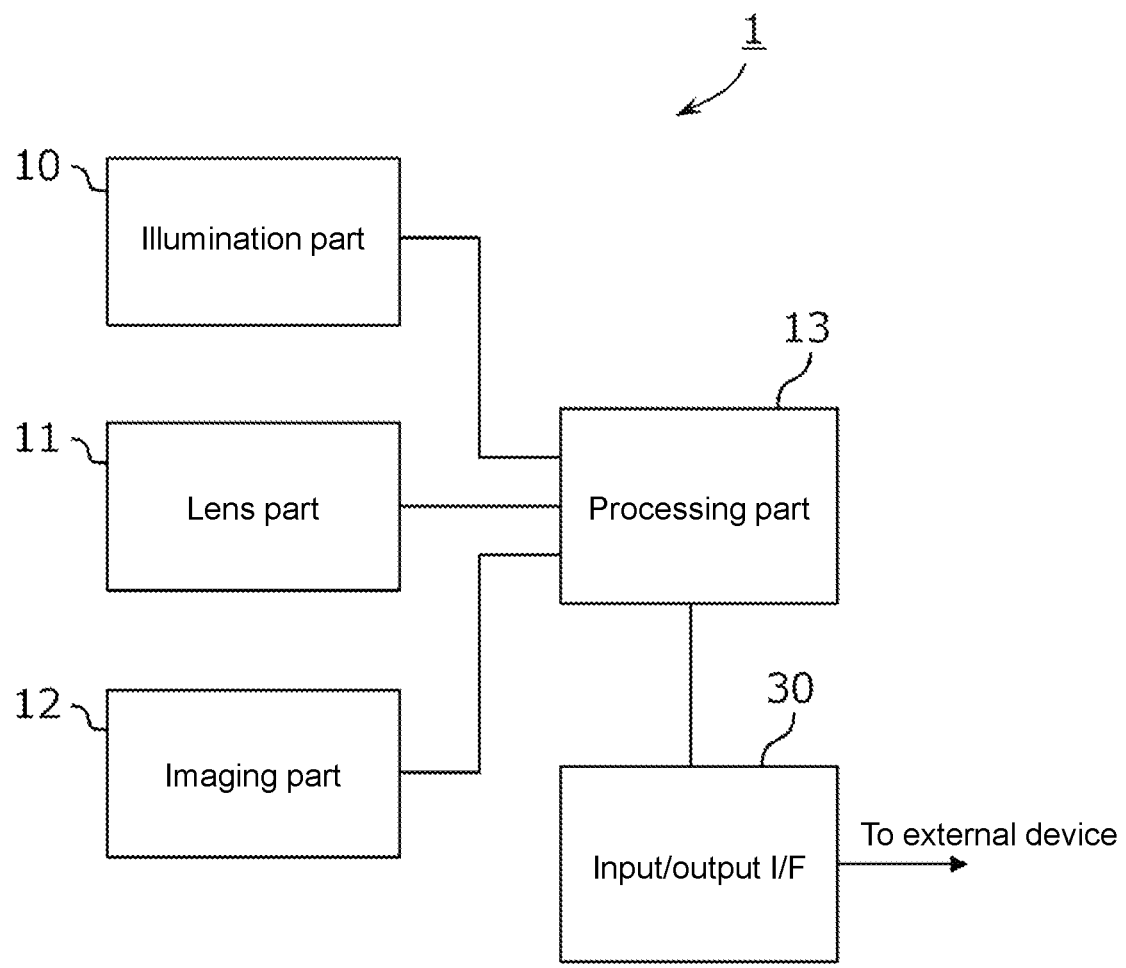
FIG. 4 is a block diagram schematically showing the configuration of the image sensor.

Referring to FIG. 2, FIG. 3A, FIG. 3B, and FIG. 4, an image sensor according to an embodiment of the disclosure and its use example will be described. FIG. 2 shows an example of a sensor system using an image sensor according to an embodiment of the disclosure. FIG. 3A is a perspective view schematically showing the appearance of the image sensor, and FIG. 3B is a perspective view schematically showing a state in which the image sensor is disassembled. FIG. 4 is a block diagram schematically showing the configuration of the image sensor. In the following description, the direction parallel to the optical axis of the lens part 11 will be referred to as the Z direction, the longitudinal direction of the imaging surface of the imaging part 12 will be referred to as the Y direction, and the lateral direction of the imaging surface of the imaging part 12 will be referred to as the X direction.

The sensor system 2 of the present embodiment is a system for inspecting and managing a product 21 in a production line or the like and includes a plurality of image sensors 1 and an information processing device 20. The information processing device 20 is connected to the image sensors 1 by a network 22 for industrial use such as EtherCAT and can transmit and receive data to and from each of the image sensors 1 via the network 22. In the example of FIG. 2, three image sensors 1 for imaging the product 21 flowing on a conveyor 23 are provided. However, the number of the image sensors 1 is not limited to three, and in a large factory, several tens to several hundreds of image sensors or more may be provided.

The image sensor 1 for industrial use is a device used for various processing using images. The image sensor 1 is also called a vision sensor or a vision system. The image sensor 1 of the present embodiment is a processing-integrated-type image sensor (so-called smart camera) in which an imaging system and a processing system are integrated.

The image sensor 1 includes an illumination part 10, a lens part 11, and an imaging part 12 as an imaging system. The illumination part 10 is a device for illuminating a subject (e.g., an inspection object) within the field of view of the image sensor 1 and is constituted by, for example, a plurality of light sources (e.g., LEDs) arranged around the lens part 11, driving circuits thereof, etc. The lens part 11 is an optical system for forming an optical image of the subject on the imaging part 12 and may be, for example, an optical system having functions of focus adjustment, a diaphragm, zoom, etc. The imaging part 12 is a device for generating and outputting image data through photoelectric conversion and is constituted by, for example, an imaging element such as CCD or CMOS.

The image sensor 1 also includes a processing part 13 and an input/output I/F 30 as a processing system. The processing part 13 is a device for performing image processing (e.g., preprocessing, feature amount extraction, etc.) on the image data captured from the imaging system, various processing (e.g., inspection, character recognition, individual identification, etc.) based on the result of the image processing, data transmission and reception to and from an external device via the input/output I/F 30, generation of data to be output to the external device, processing on the data received from the external device, control of the imaging system and the input/output I/F 30, etc. The processing part 13 is constituted by, for example, a processor, a memory, etc., and the processor reads and executes a program stored in the memory to thereby implement the various processing described above. Some or all of the functions of the processing part 13 may be realized by an ASIC, an FPGA, or the like, or may be provided by an external device. The input/output I/F 30 is a communication interface for transmitting and receiving data to and from an external device. For example, the input/output I/F 30 may include a network interface for connecting to a PLC or a management terminal (computer), a parallel interface for connecting to another sensor or controller, etc.

The image sensor 1 of the present embodiment has a modular structure and, as shown in FIG. 3B, has a structure in which three modules, including the illumination part 10, the lens part 11, and the imaging part 12, are selected and assembled with respect to a sensor main body 31. With regard to the illumination part, the image sensor 1 may be used without selecting the illumination part. Each of the modules is fixed to the sensor main body 31 by screw fixing, for example, and the modules may be freely attached/detached by a user.

For example, a plurality of types of modules, in which the wavelength of the illumination light, e.g., white illumination/red illumination/infrared light illumination, is different and the arrangement, light quantity, and light emission pattern of light emitting elements are different, are prepared as the illumination part (illumination module) 10. Also, by providing a plurality of types of light sources (e.g., LEDs) such as red, blue, green, infrared, etc. in one module and controlling the light emission of each of the light sources, an illumination module capable of irradiating light of wavelengths other than red, blue, green, and infrared (e.g., white, violet, pink, etc.) may be provided. This type of illumination is called multi-color illumination. Moreover, for example, a plurality of types of modules, including a module having a function capable of automatically adjusting the focus through manual operation or an actuator, modules having different fields of view such as a narrow field of view/wide field of view, a module having a zoom function, etc., are prepared as the lens part (lens module) 11. Also, for example, a plurality of types of modules, in which the number of pixels, the frame rate, the shutter system (rolling shutter/global shutter), etc. are different, are prepared as the imaging part 12. The user may appropriately combine suitable modules according to the use and required specification of the image sensor 1.

The image sensor 1 may be used for various purposes, such as recording of an image of the inspection object, recognition of a shape, detection of an edge, measurement of a width/number, area measurement, color characteristic acquisition, labeling and segmentation, object recognition, reading of bar codes and two-dimensional codes, OCR, individual identification, etc.

<Dew Condensation Prevention Structure>

Figure 5:
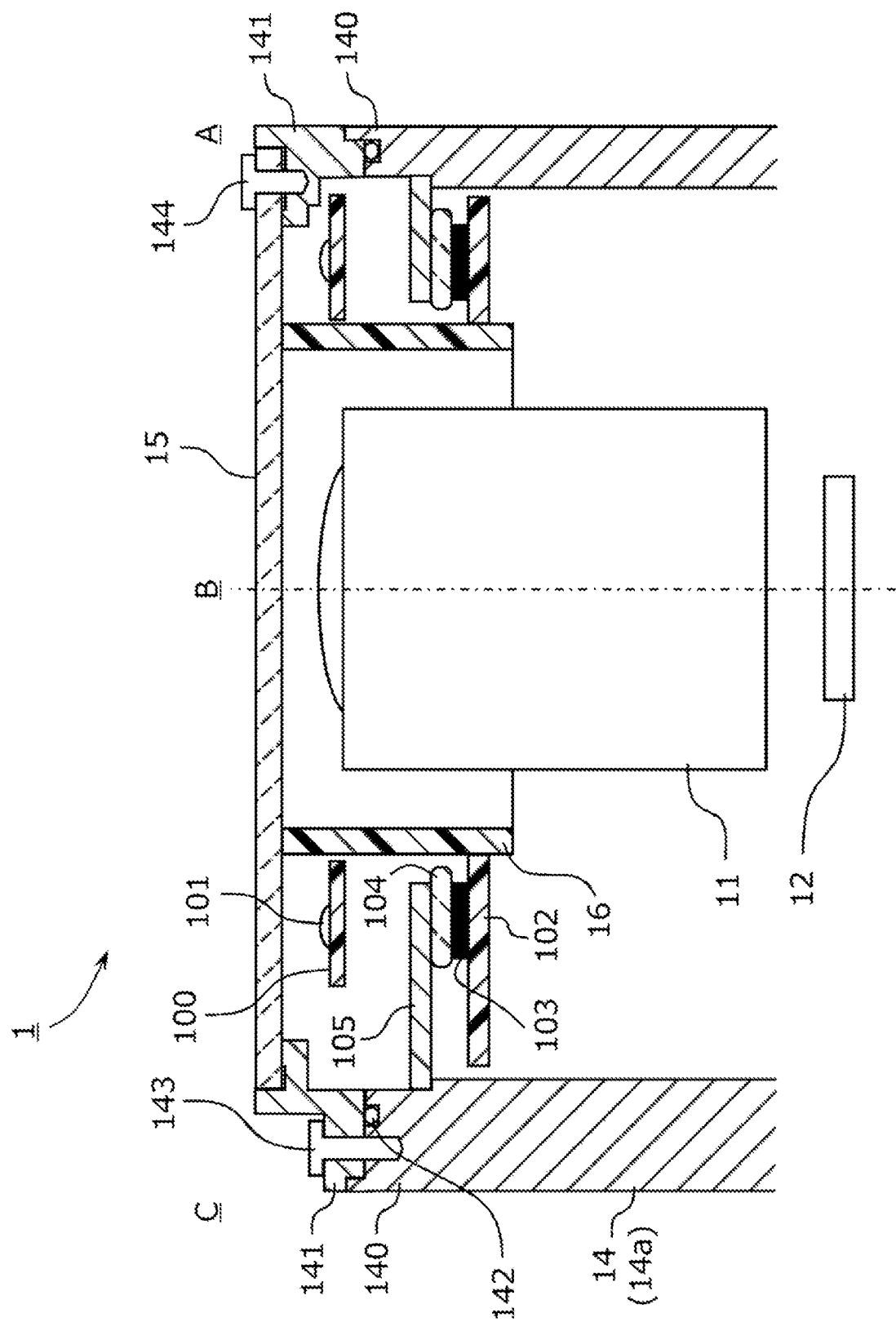
FIG. 5 is a partial cross-sectional view showing the structure around the illumination part of the image sensor.
Figure 6:
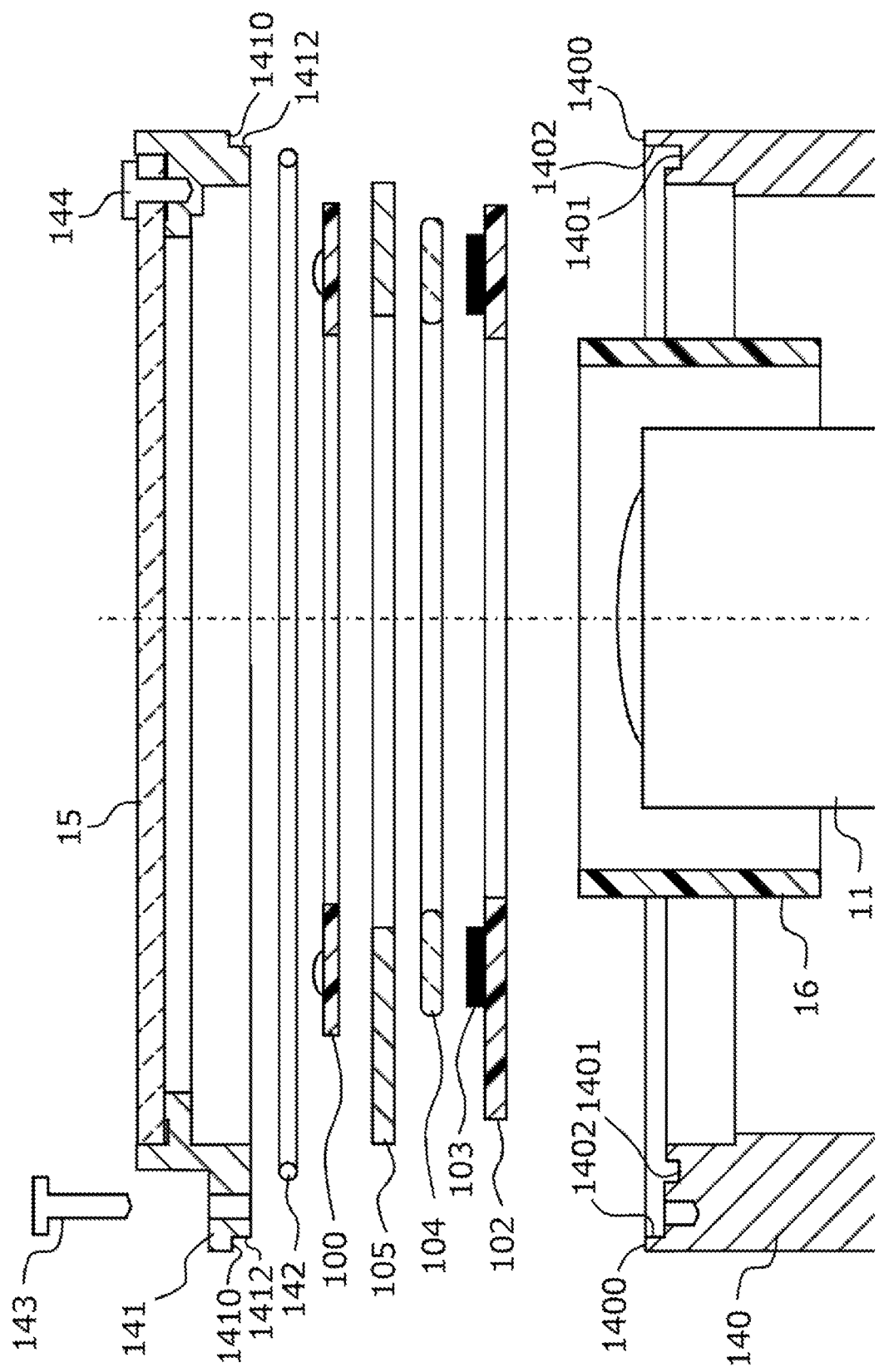
FIG. 6 is an exploded view showing the structure around the illumination part of the image sensor.

Referring to FIG. 5 and FIG. 6, a specific embodiment of a dew condensation prevention structure of the image sensor 1 will be described. FIG. 5 is a partial cross-sectional view showing the structure around the illumination part of the image sensor 1, and FIG. 6 is an exploded view of FIG. 5. FIG. 5 and FIG. 6 show a cross section taken along line A-B-C of FIG. 3A. That is, in FIG. 5 and FIG. 6, the right side of the dot-dashed line shows a cross section in the YZ plane passing through the optical axis, and the left side of the dot-dashed line shows a cross section in the plane passing through the optical axis and the center of a screw fixing the corner part of the illumination part 10.

In the image sensor 1 of the present embodiment, the case member 14a of the housing 14 is constituted by a plurality of case members including an illumination case member and a main body case member. A packing is provided between each of the case members as a sealing member (seal member) to secure the airtightness of the housing 14. In the present embodiment, the structure of the housing 14 is designed to have a dustproof property and a waterproof property compliant with IP67.

The illumination case member is constituted by an illumination hood 140, which is a first member, and an illumination hood cover 141, which is a second member. The illumination hood 140 is a cylindrical member which forms a space for accommodating the illumination part 10 and the lens part 11. The illumination hood cover 141 is a frame-shaped member to which the cover member 15 is fixed, and, as shown in FIG. 6, the illumination hood cover 141 and the cover member 15 are integrated and fastened to the front end (Z-direction edge) of the illumination hood 140 by a screw 143. By adopting such a structure, attachment and detachment of the cover member 15, that is, access to the internal space of the case member 14a, becomes easy, and assembly and replacement operations of the illumination part 10, the lens part 11, and the imaging part 12 also become easy. Such a structure is suitable for an image sensor having a modular structure in which the illumination part 10, the lens part 11, the imaging part 12, etc. are modularized as in the present embodiment and can be assembled and replaced on the user's end. Screw fixing, adhesion with an adhesive or a double-sided tape, or the like may be used for fastening between the illumination hood cover 141 and the cover member 15. In the present embodiment, the cover member 15 is fixed to the illumination hood cover 141 by a screw 144 and a double-sided tape, which also serves as the sealing member (the details will be described later).

Both the illumination hood 140 and the illumination hood cover 141 are formed of a material having a high thermal conductivity (e.g., a metal material). In the present embodiment, as an example, the illumination hood 140 and the illumination hood cover 141 manufactured through aluminum die casting are used.

As shown in FIG. 6, a step having a first surface 1400 parallel to the XY plane (i.e., perpendicular to the Z direction) and a second surface 1402, which is an inner peripheral surface parallel to the Z direction, is formed at the front end (i.e., the portion where the illumination hood cover 141 is attached) of the illumination hood 140. A groove 1401 in which a packing 142 is provided as the sealing member is provided at the front end of the illumination hood 140. On the other hand, a step having a first surface 1410 parallel to the XY plane (i.e., perpendicular to the Z direction) and a second surface 1412, which is an outer peripheral surface parallel to the Z direction, is formed at the rear end (i.e., the portion attached to the illumination hood 140) of the illumination hood cover 141.

To assemble these components, first, the packing 142 is provided in the annular groove 1401 of the illumination hood 140, and the illumination hood cover 141 is attached from above. At this time, the second surface 1412 of the illumination hood cover 141 is guided by the second surface 1402 of the illumination hood 140 so that positioning of the illumination hood cover 141 in the XY plane is achieved. In addition, the first surface 1410 of the illumination hood cover 141 abuts against the first surface 1400 of the illumination hood 140 so that positioning of the illumination hood cover 141 in the Z direction is also achieved. Thereafter, the cover member 15 and the illumination hood cover 141 are firmly fixed to the illumination hood 140 by screw fixing with the screw 143 from above the illumination hood cover 141.

In this state, two contact parts, including a first contact surface (contact of the first surfaces 1400 and 1410) perpendicular to the Z direction and a second contact surface (contact of the second surfaces 1402 and 1412) parallel to the Z direction, are formed between the illumination hood 140 and the illumination hood cover 141. By adopting such a structure, first, there are advantages that the two members can be positioned in the Z direction by the first contact surface, the compression amount (crushing amount) of the packing 142 can be appropriately controlled in the Z direction, and the dustproof property/waterproof property at the joint between the illumination hood 140 and the illumination hood cover 141 can be appropriately secured. Second, by adopting the structure in which the two members are brought into contact not only by the first contact surface but also by the second contact surface, there is an advantage that the contact area can be increased as much as possible and heat conductivity between the illumination hood 140 and the illumination hood cover 141 can be increased. In other words, according to the structure of the present embodiment, it is possible to achieve both the "dustproof property/waterproof property" and "heat conductivity", which are originally contradictory requirements.

The illumination part 10 has a light source substrate 100 and a light source control substrate 102. A plurality of light sources 101 are arranged in the light source substrate 100. For example, an LED or the like is used as the light source 101. In addition, the light source control substrate 102 is provided with a driving circuit 103 for controlling the light source 101. In the present embodiment, the heat generated by the driving circuit 103 is used for preventing dew condensation. For this reason, the illumination part 10 is provided with a heat conduction sheet 104 and a heat conduction plate 105 as a heat conduction member for efficiently transferring the heat of the driving circuit 103 to the case member 14*a* (the illumination hood 140). By sandwiching the heat conduction sheet 104 having cushioning properties between the heat conduction plate 105 and the driving circuit 103, heat conductivity from the driving circuit 103 to the heat conduction plate 105 is improved. The heat conduction plate 105 is made of a material having a high thermal conductivity (e.g., a metal material), and its outer peripheral end portion is configured to directly contact the inner peripheral surface of the case member 14*a* (the illumination hood 140). With this structure, the heat of the driving circuit 103 is efficiently transmitted to the case member 14*a*.

Figure 7:
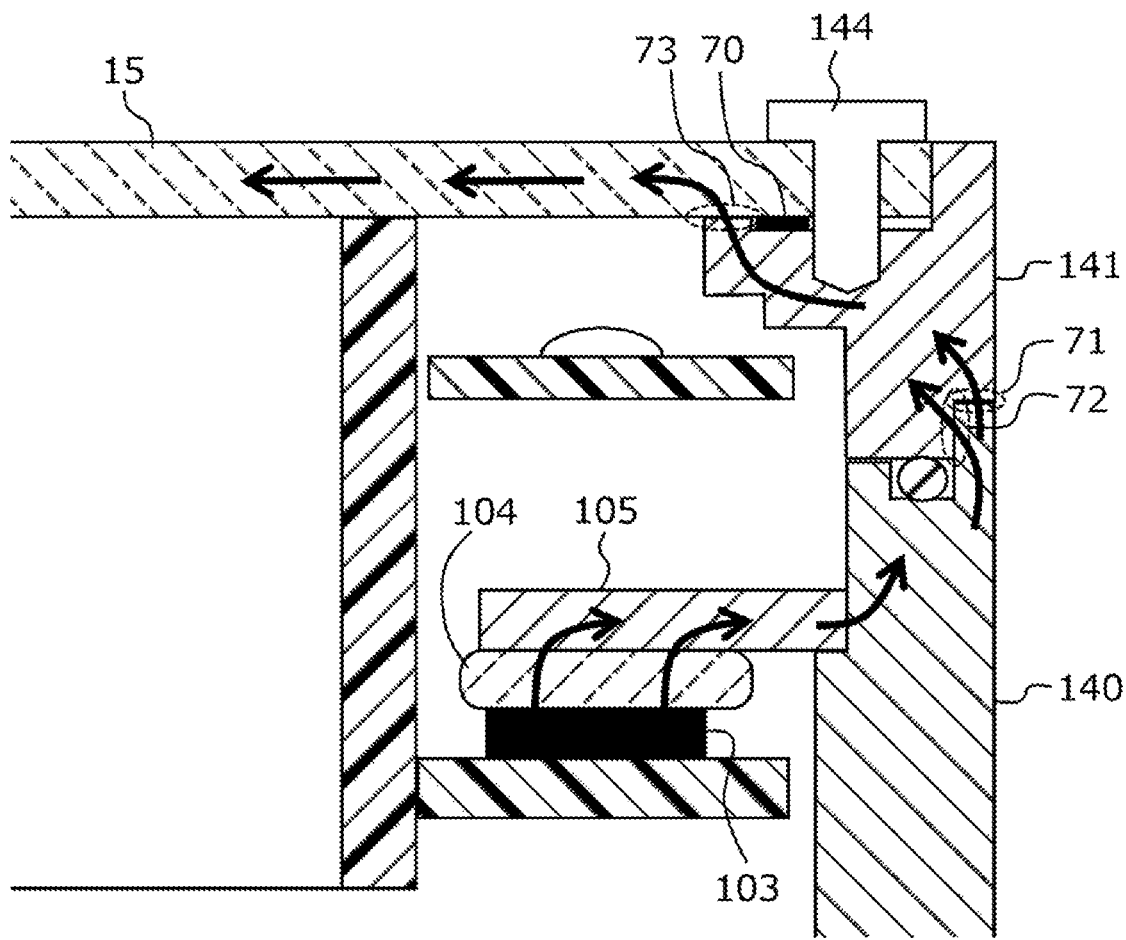
FIG. 7 is a view schematically showing a heat transfer structure and a heat transfer path.
Figure 8:
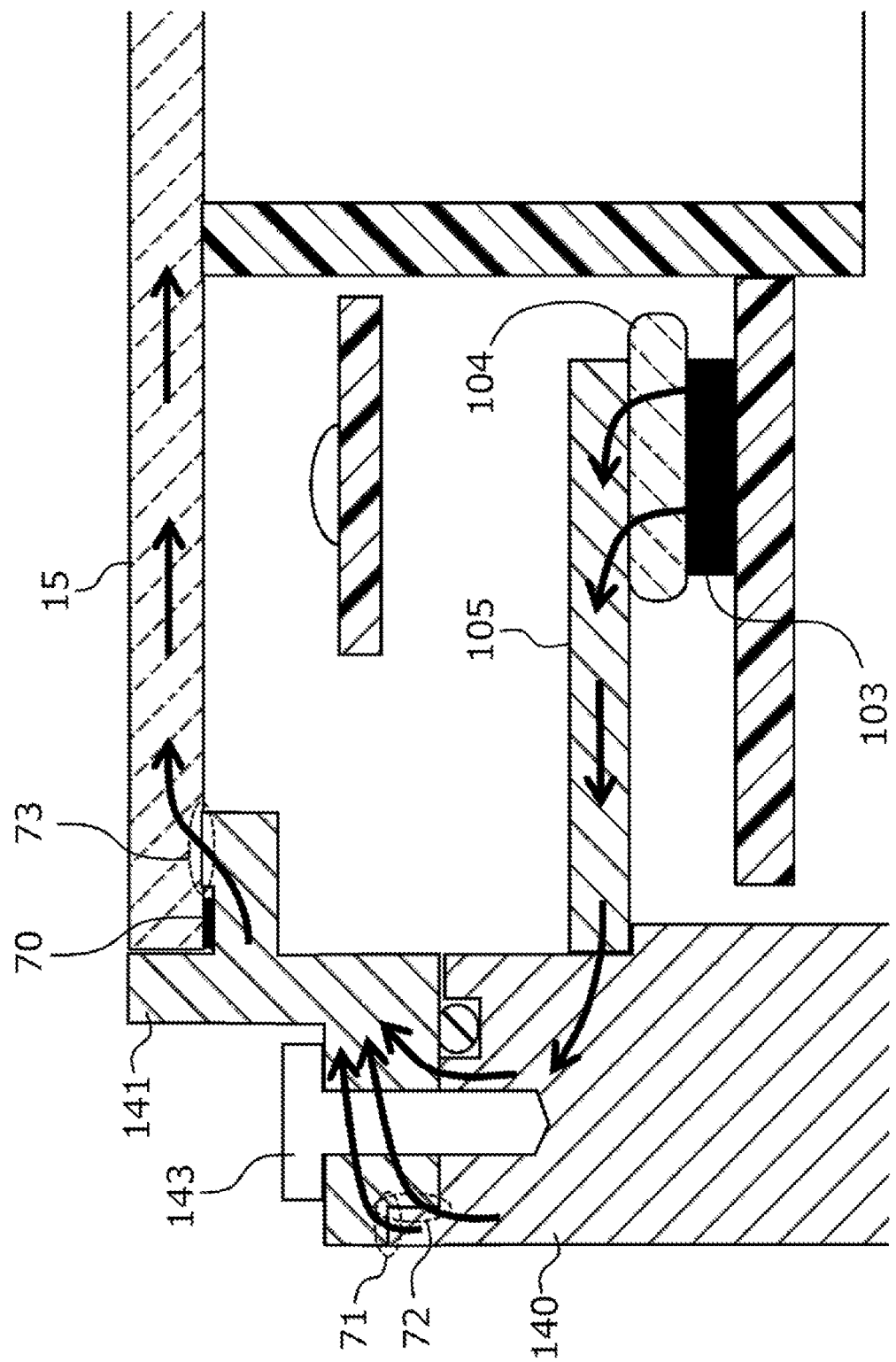
FIG. 8 is a view schematically showing the heat transfer structure and the heat transfer path.

FIG. 7 and FIG. 8 schematically show enlarged views of a heat transfer structure and a heat transfer path. As shown in the figures, the illumination hood cover 141 and the cover member 15 are fixed by a double-sided tape 70 and the screw 144. The double-sided tape 70 serves as a function of fixing the illumination hood cover 141 and the cover member 15 and also as a sealing member (seal member) for sealing the gap between the two members. Furthermore, a contact part 73 at which the illumination hood cover 141 and the inner surface of the cover member 15 are in direct contact is formed at a position closer to the center of the cover member 15 than the sealing structure with the double-sided tape 70 between the illumination hood cover 141 and the cover member 15. At the screw fixing portion, as shown in FIG. 7, the double-sided tape 70 may be arranged closer to the center of the cover member 15 than the screw fixing position of the screw 144.

In such a structure, the heat of the driving circuit 103 is transmitted to the illumination hood 140 via the heat conduction sheet 104 and the heat conduction plate 105 and is transmitted to the illumination hood cover 141 via a first contact surface 71 and a second contact surface 72. Then, the heat is transmitted from the illumination hood cover 141 to the cover member 15 via the contact part 73. As a result, the cover member 15 is heated so that it is possible to suppress occurrence of dew condensation on the inner surface of the cover member 15.

Figure 9B:
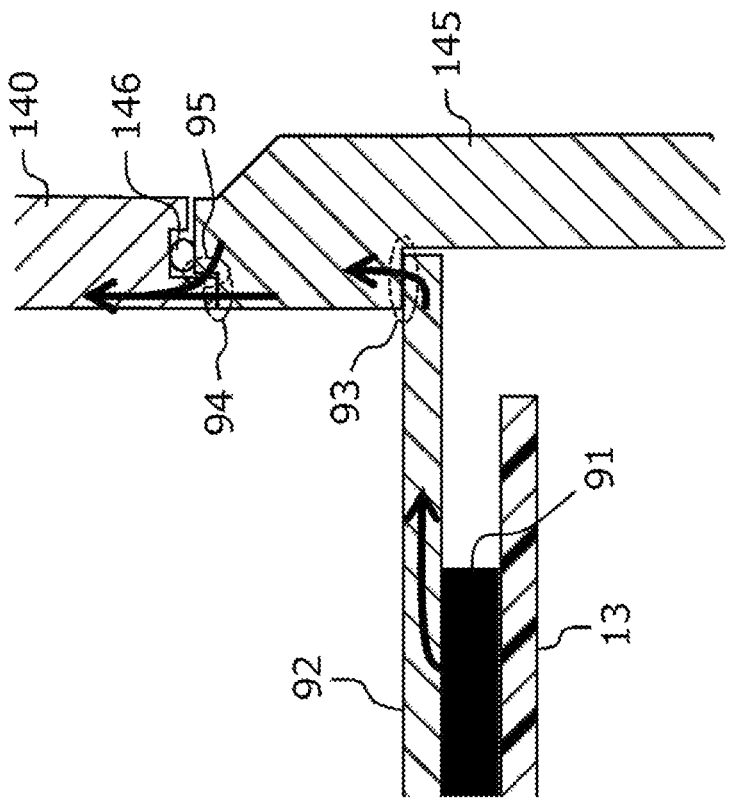
FIG. 9B is an enlarged view of the broken line portion of FIG. 9A.
Figure 9A:
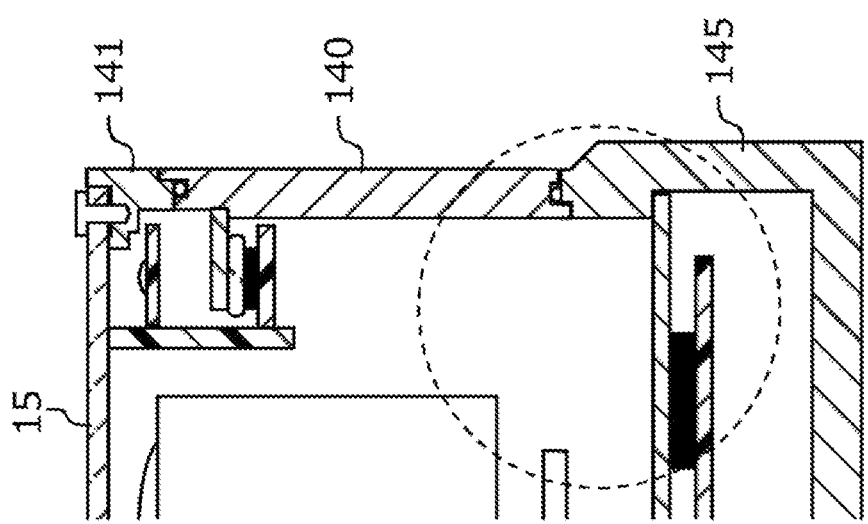
FIG. 9A is a partial cross-sectional view schematically showing a heat transfer structure and a heat transfer path around the processing part of the image sensor.

Referring to FIG. 9A and FIG. 9B, an example of using the heat generated by the processing part 13 for preventing dew condensation will be described. FIG. 9A and FIG. 9B are partial cross-sectional views showing a heat transfer structure and a heat transfer path around the processing part of the image sensor 1. FIG. 9B is an enlarged view of the broken line portion of FIG. 9A.

As shown in FIG. 9A, the housing 14 of the present embodiment has a separable structure between the illumination hood 140 and the main body case member 145. The main body case member 145 is a box-shaped member forming a space for accommodating the processing part 13, the input/output I/F 30, a power supply circuit (not shown), etc. In the present embodiment, the main body case member 145 manufactured through aluminum die casting is used. The illumination hood 140 and the main body case member 145 are fixed by screws (not shown).

A step having a first surface parallel to the XY plane (i.e., perpendicular to the Z direction) and a second surface, which is an outer peripheral surface parallel to the Z direction, is formed at the rear end (i.e., the mating surface with the main body case member 145) of the illumination hood 140. Further, a groove in which a packing 146 is provided as the sealing member is provided at the rear end of the illumination hood 140. On the other hand, a step having a first surface parallel to the XY plane (i.e., perpendicular to the Z direction) and a second surface, which is an inner peripheral surface parallel to the Z direction, is formed at the front end (i.e., the mating surface with the illumination hood 140) of the main body case member 145.

To assemble these components, first, the packing 146 is provided in the annular groove of the illumination hood 140, and the main body case member 145 is attached from above. At this time, the second surface of the main body case member 145 is guided by the second surface of the illumination hood 140 so that positioning of the illumination hood 140 in the XY plane is achieved. In addition, the first surface of the main body case member 145 abuts against the first surface of the illumination hood 140 so that positioning of the illumination hood 140 in the Z direction is also achieved.

Thereafter, the illumination hood 140 and the main body case member 145 are firmly fixed to each other by screw fixing.

In this state, two contact parts, including a first contact surface 94 perpendicular to the Z direction and a second contact surface 95 parallel to the Z direction, are formed between the illumination hood 140 and the main body case member 145. By adopting such a structure, first, there are advantages that the two members can be positioned in the Z direction by the first contact surface 94, the compression amount (crushing amount) of the packing 146 can be appropriately controlled in the Z direction, and the dustproof property/waterproof property at the joint between the illumination hood 140 and the main body case member 145 can be appropriately secured. Second, by adopting the structure in which the two members are brought into contact not only by the first contact surface 94 but also by the second contact surface 95, there is an advantage that the contact area can be increased as much as possible and heat conductivity between the illumination hood 140 and the main body case member 145 can be increased. In other words, according to the structure of the present embodiment, it is possible to achieve compatibility between the "dustproof property/waterproof property" and "heat conductivity", which are originally contradictory requirements.

The processing part 13 has a processor 91 such as a CPU or an FPGA. Since the heat generated by such a processor 91 is high, it is advisable to use the heat for preventing dew condensation. In the example of FIG. 9B, a heat conduction plate 92 made of metal is attached to the processor 91 as a heat conduction member, and the heat conduction plate 92 is fixed to the main body case member 145 by a screw (not shown). With such a structure, the heat of the processor 91 is transmitted to the heat conduction plate 92 and is transmitted to the main body case member 145 via a contact part 93. Then, the heat is transmitted from the main body case member 145 to the illumination hood 140 via the first contact surface 94 and the second contact surface 95. The subsequent heat transfer path is as shown in FIG. 7.

According to the present embodiment described above, by adopting the structure in which the heat transfer structure is provided in the housing 14 of the image sensor 1, it is possible to form a heat transfer path from inside the housing to the cover member 15 while avoiding physical interference between the heat transfer structure and the wall member 16 present inside the housing. Therefore, even in the image sensor 1 having the structure in which the space R11 where the lens part 11 is arranged and the space R10 where the illumination part 10 is arranged are partitioned by the wall member 16, it is possible to effectively suppress occurrence of dew condensation on the cover member 15.

Further, in the present embodiment, with the case member 14a being configured to be separable, the packing 142 is provided between the illumination hood 140 and the illumination hood cover 141, and the structure in which the illumination hood 140 and the illumination hood cover 141 are in direct contact is adopted. In addition, the packing 146 is provided between the illumination hood 140 and the main body case member 145, and the structure in which the illumination hood 140 and the main body case member 145 are in direct contact is adopted. As a result, it is possible to realize a housing (case member) that simultaneously satisfies separability, dustproof property, waterproof property, and heat conductivity requirements.

MODIFIED EXAMPLE

Figure 10:
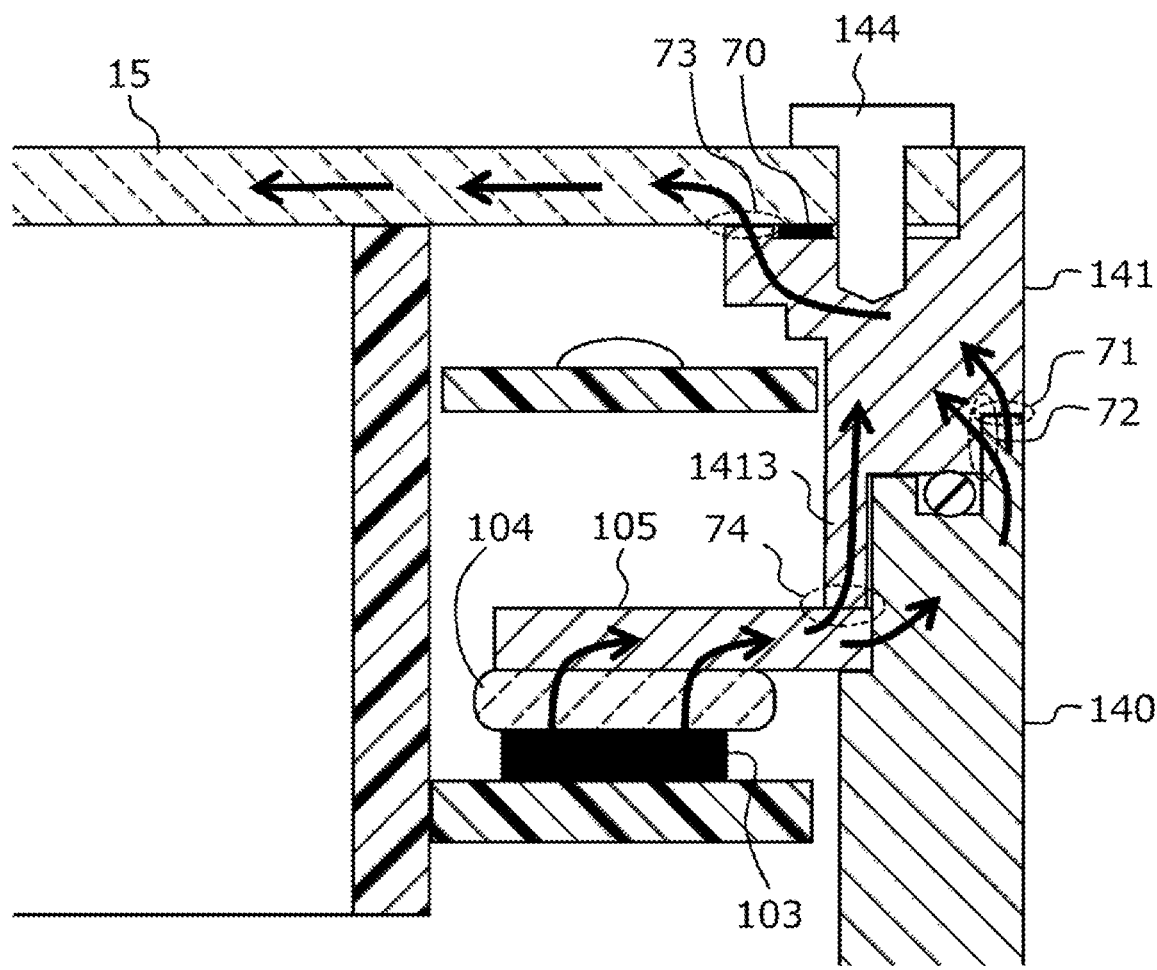
FIG. 10 is a view showing a modified example of the illumination hood cover.

FIG. 10 shows a modified example of the illumination hood cover 141. The illumination hood cover 141 shown in FIG. 10 is characterized by having an extension part 1413 extending toward the driving circuit 103 as the heating body. The tip of the extension part 1413 is in contact with the heat conduction plate 105 (a heat conduction sheet having cushioning properties may be sandwiched between the extension part 1413 and the heat conduction plate 105 to enhance the adhesion therebetween). In this way, since the illumination hood cover 141 itself has a structure in contact with the driving circuit 103, the heat of the driving circuit 103 is directly transmitted to the illumination hood cover 141 via a contact part 74, and it becomes possible to obtain heat transfer that is more efficient than that of the structure shown in FIG. 7 or the like. As a result, it is possible to more effectively suppress occurrence of dew condensation.

<Others>

The above embodiments merely exemplify some configuration examples of the disclosure. The disclosure is not limited to the specific forms described above, and various modifications are possible within the scope of its technical concept. For example, in the above embodiments, the heat of the driving circuit 103 is used, but the heat of the light source substrate 100 (the light source 101) may also be used for preventing dew condensation. In that case, a structure that brings the light source substrate 100 and the case member 14a into contact directly or via a heat conduction member may be adopted. Although not shown, it is also possible to use the heat from other heating bodies (e.g., a power supply IC, coil parts, etc.) present inside the housing 14 for preventing dew condensation. Moreover, in the above embodiments, a smart camera having a modular structure is exemplified, but the disclosure may also be applied to smart cameras that do not have modular structures and may also be applied to conventional image sensors that do not have image processing functions. Further, in the above embodiments, the case where the case member 14a is separated into the illumination hood 140, the illumination hood cover 141, and the main body case member 145 has been exemplified, but the separation structure of the case member is not limited thereto. For example, the number of separation points may be one or three or more. In the case of either configuration, it is advisable to adopt a structure that secures the dustproof property, the waterproof property, and heat conductivity at the separation point.

<Appendix>

An image sensor (1) including:

an illumination part (10) for illuminating a subject;

a lens part (11) for forming an optical image of the subject;

an imaging part (12) for generating an image based on the optical image; and a housing (14) for accommodating the illumination part (10), the lens part (11), and the imaging part (12), wherein a light-transmissive cover member (15) covering a front side of the lens part (11) and the illumination part (10) is attached to the housing (14), and a wall member (16) partitioning a space (R11) where the lens part (11) is arranged and a space (R10) where the illumination part (10) is arranged is provided inside the housing (14), and the housing (14) has a heat transfer structure for transferring heat generated inside the housing (14) to the cover member (15).

What is claimed is:

1. An image sensor comprising:

an illumination part for illuminating a subject;

a lens part for forming an optical image of the subject;

an imaging part for generating an image based on the optical image; and a housing for accommodating the illumination part, the lens part, and the imaging part, wherein a cover member covering a front side of the lens part and the illumination part is attached to the housing, the cover member is light-transmissive, and a wall member partitioning a space where the lens part is arranged and a space where the illumination part is arranged is provided inside the housing, and the housing has a heat transfer structure for transferring heat generated inside the housing to the cover member, wherein the housing comprises a case member made of metal, the case member is in contact with a heating body present inside the housing directly or via a heat conduction member, and the case member is in contact with the cover member directly or via a heat conduction member, so as to form the heat transfer structure, wherein the case member comprises a plurality of members comprising a first member and a second member which are separable, and a first sealing member is provided in between the first member and the second member for sealing a gap between the first member and the second member, and a first contact part at which the first member and the second member are in direct contact is formed, wherein the cover member is fixed to the second member, wherein a second sealing member is provided for sealing a gap between the second member and the cover member, and a second contact part at which the second member and the cover member are in direct contact is formed, wherein the cover member is screw-fixed to the second member, the second sealing member is provided closer to a center of the cover member than a screw fixing position where the cover member is screw-fixed to the second member, and the second contact part is further formed closer to the center of the cover member than the second sealing member.

2. The image sensor according to claim 1, wherein the second member is attached to the first member while compressing the first sealing member in a first direction, and the first contact part comprises a first contact surface perpendicular to the first direction and a second contact surface parallel to the first direction.

3. The image sensor according to claim 1, wherein the second member has an extension part extending toward the heating body and in contact with the heating body directly or via a heat conduction member.

4. The image sensor according to claim 1, wherein the illumination part comprises a light source and a driving circuit of the light source, and the heating body comprises at least one of the light source and the driving circuit of the light source.

5. The image sensor according to claim 1, comprising a processing part comprising a processor for executing processing using the image, wherein the heating body comprises the processor.

* * * * *